United States Patent
Kainuma et al.

(10) Patent No.: US 9,404,600 B2
(45) Date of Patent: Aug. 2, 2016

(54) THREE-WAY SOLENOID VALVE

(71) Applicant: FUJIKOKI CORPORATION, Tokyo (JP)

(72) Inventors: Hiroshi Kainuma, Tokyo (JP); Masashi Hayasaka, Tokyo (JP); Yasushi Kojima, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 14/717,129

(22) Filed: May 20, 2015

(65) Prior Publication Data

US 2015/0377377 A1   Dec. 31, 2015

(30) Foreign Application Priority Data

Jun. 26, 2014   (JP) .................................. 2014-131790

(51) Int. Cl.
| | | |
|---|---|---|
| *F16K 31/40* | (2006.01) | |
| *F16K 31/06* | (2006.01) | |
| *F16K 11/16* | (2006.01) | |

(52) U.S. Cl.
CPC ........... *F16K 31/0624* (2013.01); *F16K 11/161* (2013.01); *F16K 31/406* (2013.01); *F16K 31/408* (2013.01); *Y10T 137/777* (2015.04); *Y10T 137/7766* (2015.04); *Y10T 137/7769* (2015.04); *Y10T 137/7832* (2015.04); *Y10T 137/7835* (2015.04); *Y10T 137/86879* (2015.04); *Y10T 137/87772* (2015.04); *Y10T 137/87877* (2015.04)

(58) Field of Classification Search
CPC . F16K 31/0624; F16K 31/406; F16K 31/408; F16K 11/161; Y10T 137/7832; Y10T 137/7835; Y10T 137/86879; Y10T 137/87772; Y10T 137/87877; Y10T 137/7761; Y10T 137/7764; Y10T 137/7766; Y10T 137/7769; Y10T 137/777
USPC .............. 137/506, 509, 870, 883, 487.5, 489, 137/491, 492, 492.5
See application file for complete search history.

(56) References Cited

U.S. PATENT DOCUMENTS 2,432,859 A * 12/1947 Carter ................... F25B 39/028
                                                    137/110
2,578,194 A * 12/1951 Matthews ............... F23N 5/107
                                                    137/614.14

(Continued)

FOREIGN PATENT DOCUMENTS

JP         2012002282 A      1/2012

OTHER PUBLICATIONS

European Search Report in corresponding European Application No. 15168869.4 issued Dec. 14, 2015.

*Primary Examiner* — William McCallister
(74) *Attorney, Agent, or Firm* — Bacon & Thomas, PLLC

(57) ABSTRACT

There is provided a very reliable three-way solenoid valve that can reliably switch a refrigerant flow passage while ensuring a refrigerant flow rate even under a large-differential pressure environment without increasing the size of an electromagnetic coil and the like.
A valve body includes a conduction hole that communicates with a back pressure chamber formed on a side of a second valve element opposite to a second valve seat, a third valve seat that is positioned between the conduction hole and a second outlet, a third valve element that is movably disposed so as to approach and be separated from the third valve seat, a coil spring that biases the third valve element toward the third valve seat, and actuating rods that are interposed between a first valve element and the third valve element.

7 Claims, 4 Drawing Sheets

(56) References Cited

U.S. PATENT DOCUMENTS

| | | | | |
|---|---|---|---|---|
| 2,640,494 A * | 6/1953 | Kounovsky | ........... | F25B 41/046 137/601.12 |
| 2,704,649 A * | 3/1955 | Ellenberger | .......... | F25B 41/046 137/630.13 |
| 2,714,394 A * | 8/1955 | Moran | ................. | F16K 11/044 137/614.13 |
| 3,168,901 A * | 2/1965 | Eizaburo | ................ | G05D 16/10 137/489 |
| 3,308,846 A * | 3/1967 | Yuile | .................... | F16K 17/105 137/487.5 |
| 3,414,008 A * | 12/1968 | Greenwood | .......... | F16K 17/105 137/102 |
| 3,512,549 A * | 5/1970 | Wiegand | ............... | F16K 17/105 137/489 |
| 4,506,701 A * | 3/1985 | Masaki | ................. | F16K 31/082 137/596.17 |
| 5,996,606 A * | 12/1999 | Iwasaki | ..................... | E03B 7/07 137/110 |
| 6,382,256 B2 * | 5/2002 | Kim | ...................... | F16K 11/044 137/870 |

\* cited by examiner

THREE-WAY SOLENOID VALVE

BACKGROUND OF THE INVENTION

1. Field of the Invention

The present invention relates to a three-way solenoid valve, and more particularly, to a three-way solenoid valve that is suitable to switch a refrigerant flow passage in a heat pump device of, for example, a heating and cooling system and the like.

2. Description of the Related Art

In the past, a three-way solenoid valve disclosed in JP 2012-002282 A has been known as this kind of a three-way solenoid valve.

As illustrated in FIGS. 3 and 4, the three-way solenoid valve 1' in the related art includes: a valve body 2' that includes one inlet 2a', first and second outlets 2b' and 2c', and valve chests 2d' and 2e'; first and second valve seats 3' and 4' that are positioned in the valve body 2'; first and second valve elements 6' and 7' that approach and are separated from these valve seats 3' and 4' and allow the inlet 2a' and the outlets 2b' and 2c' to communicate with each other; actuating rods 9' (9a', 9b') as a plurality of actuating members that are interposed between both the valve elements 6' and 7' and come into contact with both the valve elements 6' and 7' at end portions thereof; a lid 11' that closes a lower opening of the valve body 2'; a coil spring 12' that is interposed between the lid 11' and the second valve element 7' and biases the second valve element 7' toward the second valve seat 4'; a valve holder 15' that approaches and is separated from the first valve element 6' at a lower end portion thereof; an electromagnetic coil assembly 14' that moves a plunger 13' integrated with the valve holder 15' up and down; and the like.

When current is not applied to an electromagnetic coil 14a' of the electromagnetic coil assembly 14', as illustrated in FIG. 3, the second valve element 7' is biased upward by the coil spring 12' and is seated on the second valve seat 4', and the first valve element 6' is moved up through the second valve element 7' and the actuating rods 9' and is separated from the valve seat 3'. When fluid is made to flow from the inlet 2a', differential pressure is generated on the upper and lower sides of the first valve element 6' and the first valve element 6' is biased upward. Accordingly, fluid is made to flow to the first outlet 2b' from the inlet 2a' through the valve chest 2d'.

Further, when current is applied to the electromagnetic coil 14a' in a state in which fluid is made to flow from the inlet 2a', the plunger 13' is attracted to an attractor 16' and is moved down as illustrated in FIG. 4. Accordingly, the valve holder 15' is also moved down. Immediately after the valve holder 15' is moved down, a lower end portion of the valve holder 15' comes into contact with an upper end portion of a through hole 6a' of the first valve element 6' and closes an upper opening of the through hole 6a'. Accordingly, differential pressure is removed on the upper and lower sides of the first valve element 6' and the first valve element 6' is seated on the valve seat 3' by the pressing of the valve holder 15'. The plurality of actuating rods 9' are also moved down with the movement of the plunger 13', the valve holder 15', and the first valve element 6'. Accordingly, the second valve element 7' is also moved down and is separated from the second valve seat 4'. Therefore, fluid is made to flow to the second outlet 2c' from the inlet 2a' through the valve chest 2e'.

SUMMARY OF THE INVENTION

Incidentally, since the three-way solenoid valve disclosed in JP 2012-002282 A switches a refrigerant flow passage by an elastic force of the coil spring or the application of current to the electromagnetic coil without using a differential pressure mechanism, the three-way solenoid valve is made to reliably function even under a small-differential pressure environment such as a cold district. Meanwhile, since the actuating rods are moved with the movement of the plunger and the like and the second valve element seated on the second valve seat is directly pressed and moved by the actuating rods in the three-way solenoid valve disclosed in JP 2012-002282 A, there is a possibility that the second valve element is not separated from the second valve seat and a refrigerant flow passage cannot be switched under a large-differential pressure environment. For this reason, there is a problem in that an opening diameter of the second valve seat cannot be made large.

The invention has been made in consideration of the above-mentioned circumstances, and an object of the invention is to provide a very reliable three-way solenoid valve that can reliably switch a refrigerant flow passage while ensuring a refrigerant flow rate even under a large-differential pressure environment without increasing the size of an electromagnetic coil and the like.

In order to achieve the object, according to an aspect of the invention, there is provided a three-way solenoid valve including: a valve body that is provided with an inlet, first and second outlets, a first valve seat positioned between the inlet and the first outlet, and a second valve seat positioned between the inlet and the second outlet; a first valve element that is movably disposed in the valve body so as to approach and be separated from the first valve seat; an electromagnetic actuator that drives the first valve element; and a second valve element that is movably disposed in the valve body so as to approach and be separated from the second valve seat. The valve body includes a conduction hole that communicates with a back pressure chamber formed on a side of the second valve element opposite to the second valve seat, a third valve seat that is positioned between the conduction hole and the second outlet, a third valve element that is movably disposed so as to approach and be separated from the third valve seat, a biasing member that biases the third valve element toward the third valve seat, and an actuating member that is interposed between the first valve element and the third valve element. When the first valve element is moved in the valve body by the electromagnetic actuator and approaches or is separated from the first valve seat, the third valve element approaches or is separated from the third valve seat by the actuating member or the biasing member and differential pressure between the front and the rear sides of the second valve element is changed through the conduction hole, so that the second valve element approaches or is separated from the second valve seat.

In a preferred aspect, a first valve chest in which the first valve element is disposed and a second valve chest in which the second valve element is disposed are disposed side by side in a lateral direction.

In another preferred aspect, a first valve chest in which the first valve element is disposed and a third valve chest in which the third valve element is disposed are disposed side by side in a longitudinal direction.

In another preferred aspect, a first valve chest in which the first valve element is disposed and a second valve chest in which the second valve element is disposed are disposed side by side in a lateral direction, the first valve chest and a third valve chest in which the third valve element is disposed are disposed side by side in a longitudinal direction, and the conduction hole, which allows the third valve chest and the back pressure chamber of the second valve chest to communicate with each other, is disposed so as to be inclined.

In a further preferred aspect, the diameter of a valve port formed at the second valve seat is larger than the diameter of a valve port formed at the third valve seat.

In a further preferred aspect, when the electromagnetic actuator is not actuated, the actuating member and the first valve element are disposed so as to be spaced apart from each other.

In a further preferred aspect, back pressure on a side opposite to the first valve seat is controlled by a pilot valve element driven by the electromagnetic actuator, so that the first valve element is operated.

According to the three-way solenoid valve of the aspect of the invention, the valve body includes a conduction hole that communicates with a back pressure chamber formed on a side of the second valve element opposite to the second valve seat, a third valve seat that is positioned between the conduction hole and the second outlet, a third valve element that is movably disposed so as to approach and be separated from the third valve seat, a biasing member that biases the third valve element toward the third valve seat, and an actuating member that is interposed between the first valve element and the third valve element in order to actuate the third valve element in a direction in which the third valve element is separated from the third valve seat. When the first valve element is moved in the valve body by the electromagnetic actuator and approaches or is separated from the first valve seat, the third valve element approaches or is separated from the third valve seat by the actuating member or the biasing member, and differential pressure between the front and the rear sides of the second valve element is changed through the conduction hole, so that the second valve element approaches or is separated from the second valve seat. Accordingly, it is possible to ensure the diameter of the valve port that is formed at the second valve seat while reducing the diameter of the valve port that is formed at, for example, the third valve seat. For this reason, it is possible to reliably switch a refrigerant flow passage while ensuring a refrigerant flow rate even under a large-differential pressure environment without increasing the size of the electromagnetic coil and the like.

Further, a first valve chest in which the first valve element is disposed and a second valve chest in which the second valve element is disposed are disposed side by side in a lateral direction, the first valve chest and a third valve chest in which the third valve element is disposed are disposed side by side in a longitudinal direction, and the conduction hole, which allows the third valve chest and the back pressure chamber of the second valve chest to communicate with each other, is disposed so as to be inclined. Accordingly, there is also an advantage of simplifying a process for manufacturing the three-way solenoid valve while reducing the physical size of the three-way solenoid valve.

DETAILED DESCRIPTION OF THE PREFERRED EMBODIMENTS

A three-way solenoid valve according to an embodiment of the invention will be described below with reference to the drawings.

Figure 1:
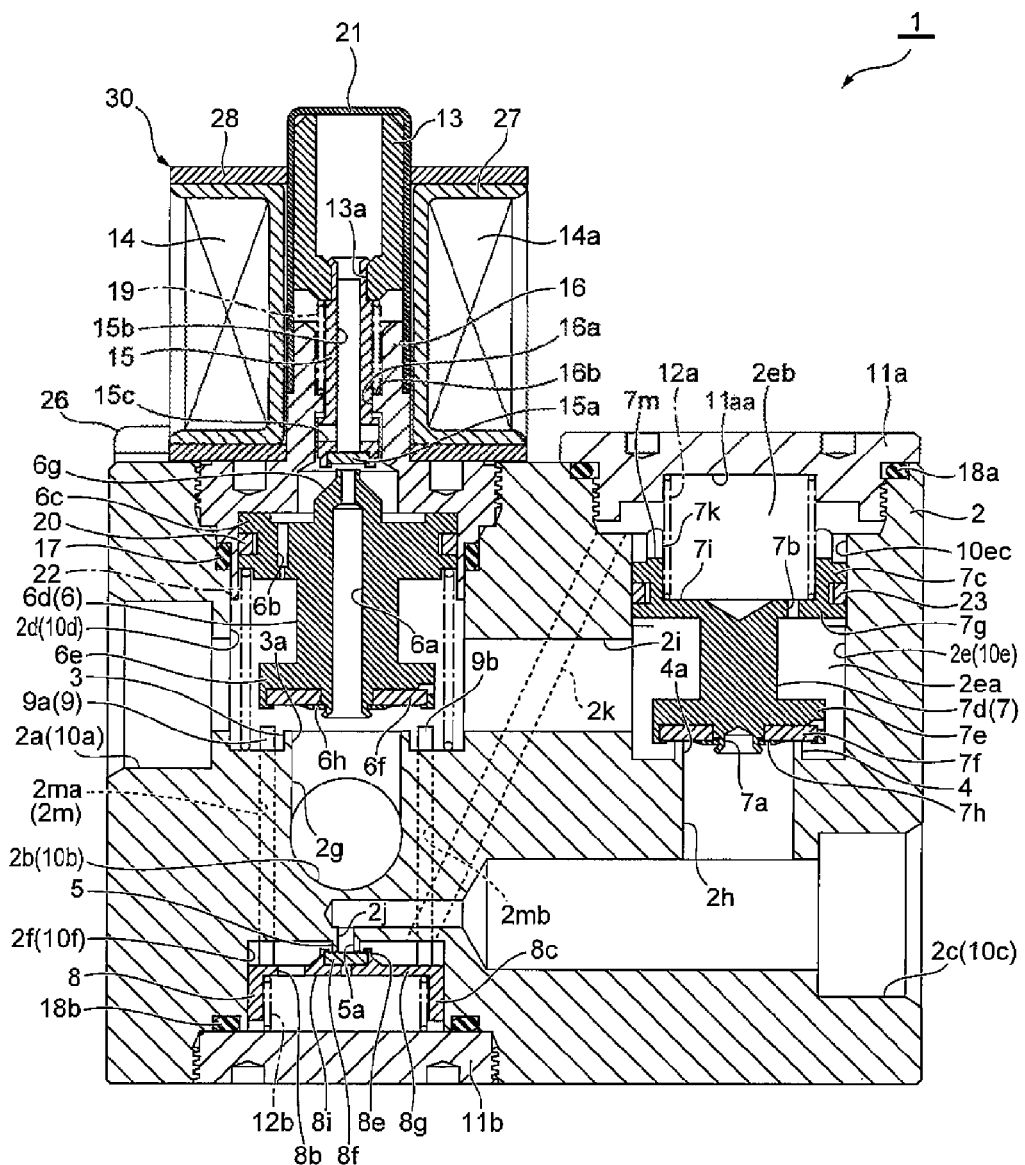
FIG. 1 is a longitudinal sectional view of a three-way solenoid valve according to an embodiment of the invention, and is a view illustrating a state in which current is not applied to an electromagnetic coil.
Figure 2:
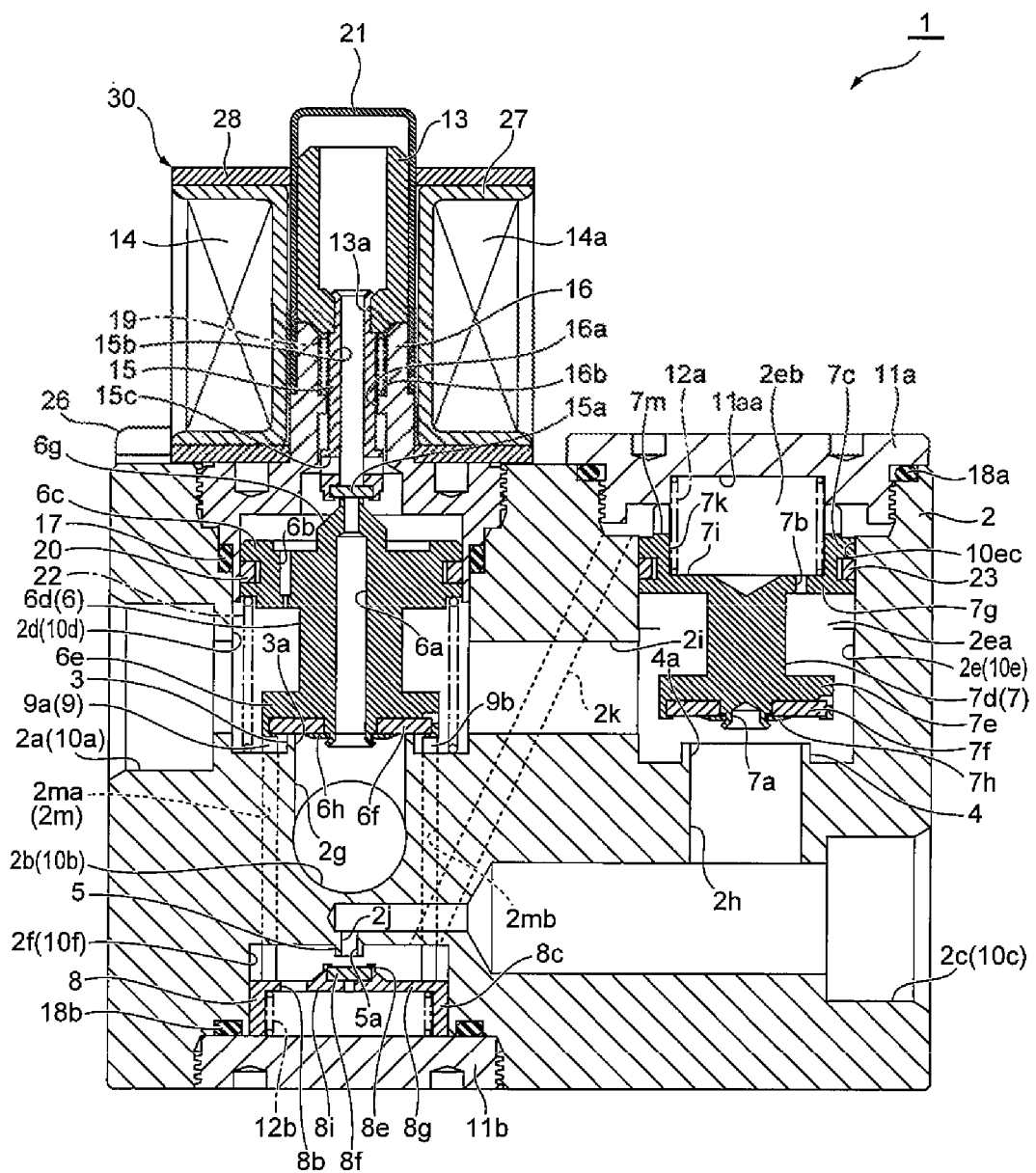
FIG. 2 is a longitudinal sectional view of the three-way solenoid valve according to the embodiment of the invention, and is a view illustrating a state in which current is applied to the electromagnetic coil.
Figure 3:
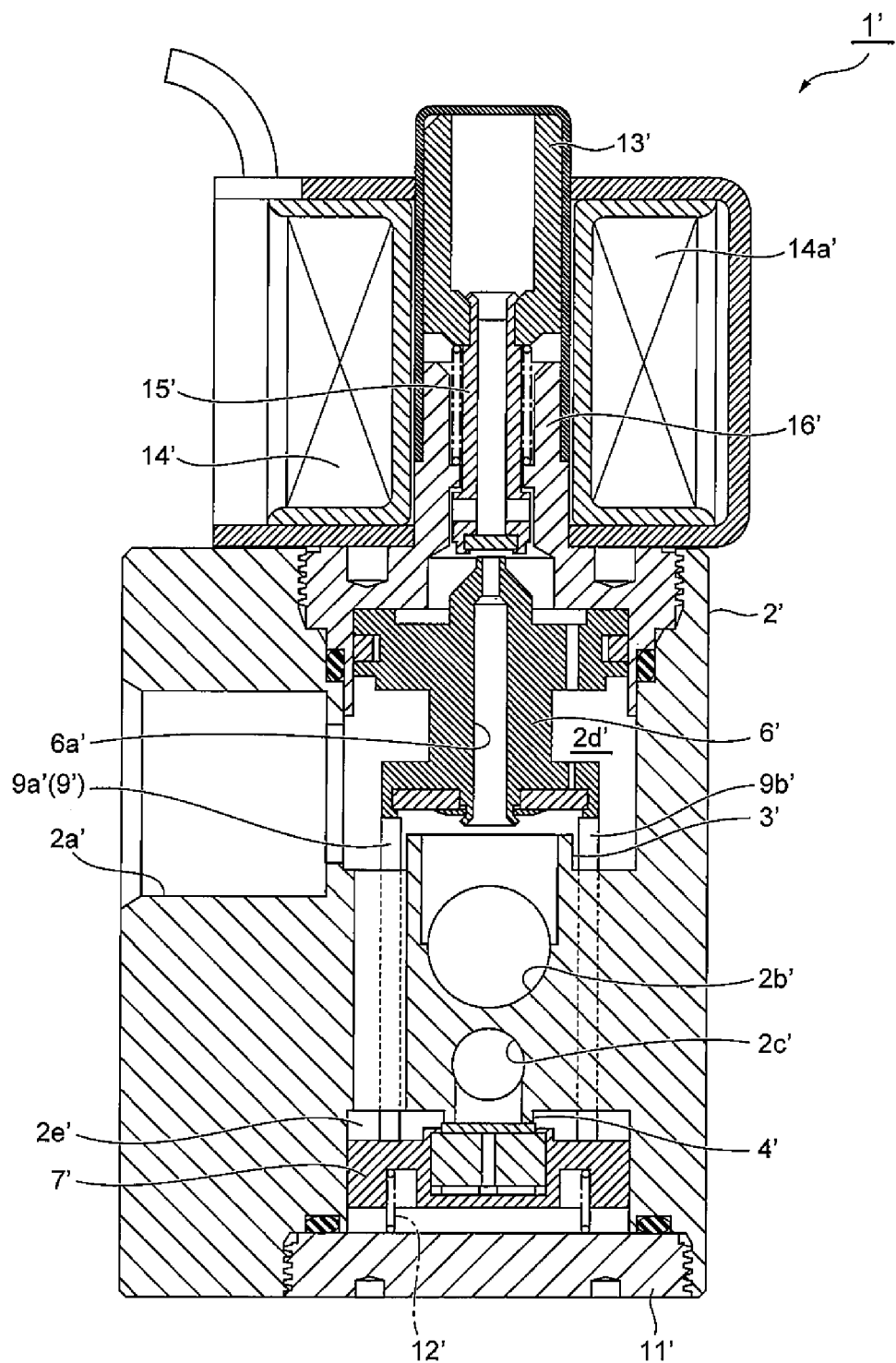
FIG. 3 is a longitudinal sectional view of a three-way solenoid valve in the related art when current is not applied to an electromagnetic coil.
Figure 4:
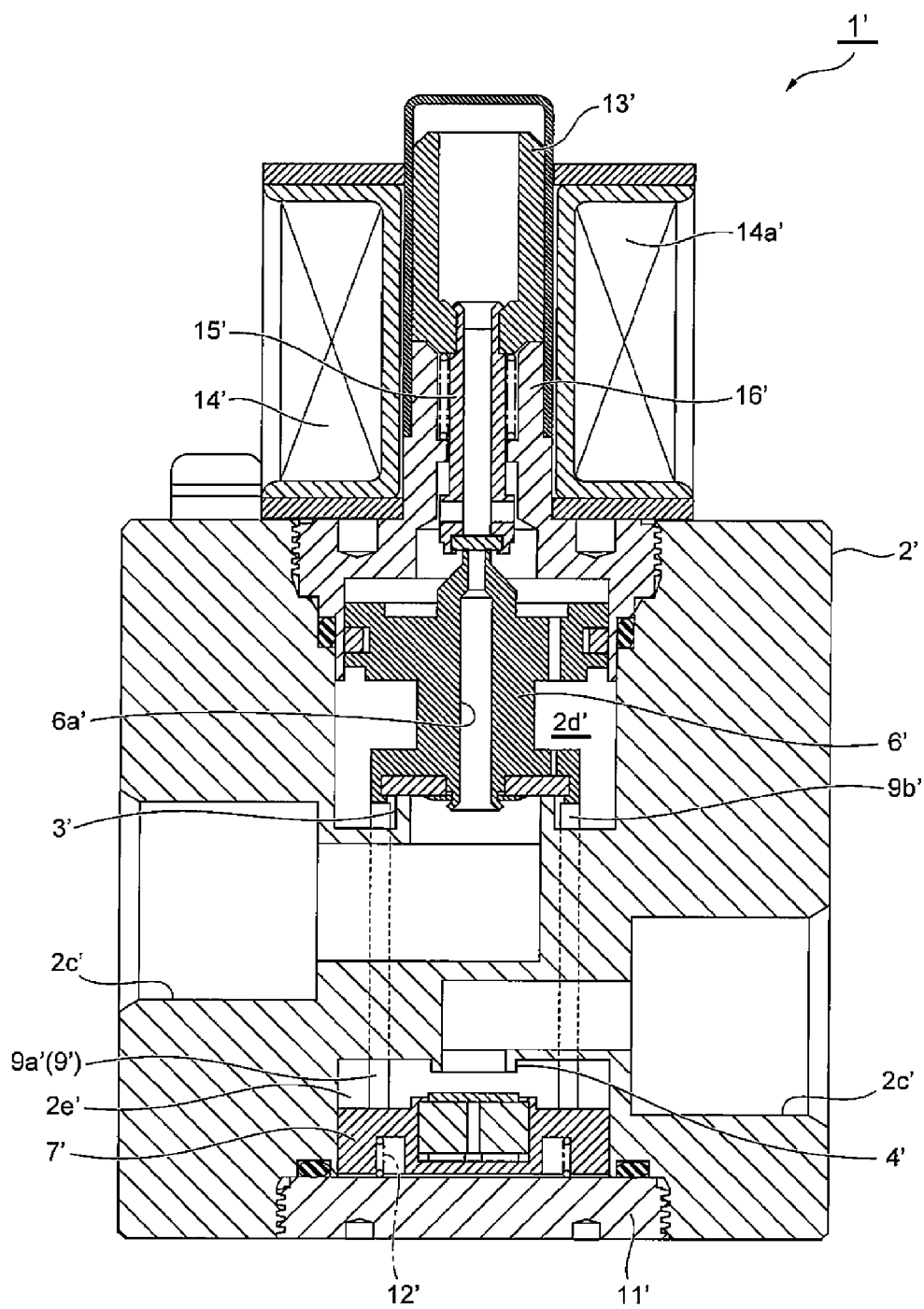
FIG. 4 is a longitudinal sectional view of the three-way solenoid valve in the related art when current is applied to the electromagnetic coil.

FIGS. 1 and 2 are longitudinal sectional views of a three-way solenoid valve according to an embodiment of the invention, and are views illustrating a state in which current is not applied to an electromagnetic coil and a state in which current is applied to the electromagnetic coil.

The entire structure of the three-way solenoid valve according to the embodiment of the invention will be described first. The illustrated three-way solenoid valve 1 mainly includes a valve body 2 that is made of, for example, metal, piston-type first to third valve elements 6 to 8, and an electromagnetic actuator 30 that is driven to move the first valve element 6 up and down by an electromagnetic force.

The valve body 2 is provided with an inlet 2a, a first outlet 2b, a second outlet 2c, a first valve seat 3 that is positioned between the inlet 2a and the first outlet 2b, a second valve seat 4 that is positioned between the inlet 2a (particularly, a portion between the inlet 2a and the first valve seat 3) and the second outlet 2c, and a third valve seat 5 that is positioned between the second outlet 2c and a back pressure chamber 2eb formed on the side of the second valve element 7 opposite to the second valve seat 4.

In detail, the valve body 2 has a substantially rectangular parallelepiped shape. Among six side surfaces (a front surface, a rear surface, a left surface, a right surface, an upper surface, and a lower surface) of the valve body 2, a lateral stepped hole 10a is formed at an upper portion of the left surface in a vertical direction so as to extend toward the right surface, and a lateral left end opening of the lateral stepped hole 10a forms the inlet 2a. Further, a lateral stepped hole 10b is formed in the vicinity of the middle of the front surface in the vertical direction and at a left portion thereof in a horizontal direction so as to extend toward the rear surface, and a lateral front end opening of the lateral stepped hole 10b forms the first outlet 2b. Furthermore, a lateral stepped hole 10c is formed at a lower portion of the right surface in the vertical direction so as to extend toward the left surface, and a lateral right end opening of the lateral stepped hole 10c forms the second outlet 2c.

Moreover, a longitudinal stepped hole 10d is formed at substantially the same position as the lateral stepped hole 10b and at a left portion of the upper surface of the valve body 2 in the horizontal direction so as to extend toward the lower surface, a female screw portion is formed at an upper end opening of the longitudinal stepped hole 10d, and a lower end face of the longitudinal stepped hole 10d extends up to the lateral stepped hole 10a including the inlet 2a. Further, a longitudinal passage 2g, which extends up to the lateral stepped hole 10b, is continuously formed substantially in the vicinity of the center of the lower end face of the longitudinal stepped hole 10d. When an attractor 16 of the electromagnetic actuator 30 to be described below is threadedly engaged with the upper end opening of the longitudinal stepped hole 10d with an O-ring 17 as a seal member interposed therebetween, the inlet 2a and the first outlet 2b communicate with each other and a first valve chest 2d to which the first valve element 6 is slidably fitted in the vertical direction is formed in the valve body 2. Furthermore, the first valve seat 3 including a first valve port 3a, which communicates with the longitudinal passage 2g and is opened and closed according to the sliding movement of the first valve element 6, is formed at the lower end face of the longitudinal stepped hole 10d so as to protrude upward.

Further, a longitudinal stepped hole 10e is formed at a right portion of the upper surface of the valve body 2 in the horizontal direction so as to extend toward the lower surface, and a female screw portion is formed at an upper end opening of the longitudinal stepped hole 10e. Furthermore, a longitudinal passage 2h, which extends up to the lateral stepped hole 10c, is continuously formed substantially in the vicinity of the center of the lower end face of the longitudinal stepped hole 10e, and a lateral passage 2i, which extends up to the right surface of the longitudinal stepped hole 10d forming the first valve chest 2d, is continuously formed on the left surface of the longitudinal stepped hole 10e. When a lid member 11a is threadedly engaged with the upper end opening of the longitudinal stepped hole 10e with an O-ring 18a as a seal member interposed therebetween and the upper end opening of the longitudinal stepped hole 10e is closed by the lid member 11a, the inlet 2a and the second outlet 2c communicate with each other (through the first valve chest 2d) and a second valve chest 2e to which the second valve element 7 is slidably fitted in the vertical direction is formed in the valve body 2. Moreover, the second valve seat 4 including a second valve port 4a, which communicates with the longitudinal passage 2h and is opened and closed according to the sliding movement of the second valve element 7, is formed at the lower end face of the longitudinal stepped hole 10e so as to protrude upward.

Here, in order to ensure workability, the lateral passage 2i is formed so that the center axis of the lateral passage 2i corresponds to the center axis of the lateral stepped hole 10a. In the illustrated embodiment, the flow passage diameter of the lateral passage 2i and the diameter of the second valve port 4a are set to be substantially the same as the diameter of the first valve port 3a. However, for example, the diameter of the second valve port 4a may be smaller than the flow passage diameter of the lateral passage 2i.

Further, a longitudinal stepped hole 10f is formed at a left portion of the lower surface of the valve body 2 in the horizontal direction and at substantially the same position as the lateral stepped hole 10b and the longitudinal stepped hole 10d so as to extend toward the upper surface, a female screw portion is formed at a lower end opening of the longitudinal stepped hole 10f, and an upper end face of the longitudinal stepped hole 10f extends up to the vicinity of a small-diameter passage formed at a deep portion of the lateral stepped hole 10c including the second outlet 2c. Furthermore, a longitudinal passage 2j, which has a small diameter and extends up to the small-diameter passage of the lateral stepped hole 10c, is continuously formed substantially in the vicinity of the center of the upper end face of the longitudinal stepped hole 10f. When a lid member 11b is threadedly engaged with the lower end opening of the longitudinal stepped hole 10f with an O-ring 18b as a seal member interposed therebetween and the lower end opening of the longitudinal stepped hole 10f is closed by the lid member 11b, a third valve chest 2f which communicates with the second outlet 2c and to which the third valve element 8 is slidably fitted in the vertical direction is formed in the valve body 2. Moreover, the third valve seat 5 including a third valve port 5a, which communicates with the longitudinal passage 2j having a small diameter and is opened and closed according to the sliding movement of the third valve element 8, is formed at the upper end face of the longitudinal stepped hole 10f so as to protrude downward.

The longitudinal stepped hole 10f and the longitudinal passage 2j are arranged on the same axis as the longitudinal stepped hole 10d and the longitudinal passage 2g. Accordingly, the first valve element 6 fitted to the first valve chest 2d and the third valve element 8 fitted to the third valve chest 2f move up and down along the same axis.

Meanwhile, the lateral stepped hole 10a, the lateral stepped hole 10c, the longitudinal stepped hole 10d, the longitudinal stepped hole 10e, the longitudinal stepped hole 10f, the longitudinal passage 2g, the longitudinal passage 2h, the lateral passage 2i, and the longitudinal passage 2j are formed on the same plane in the valve body 2.

Further, a linear conduction hole 2k is formed in the valve body 2, and allows the back pressure chamber 2eb, which is formed in the second valve chest 2e on the back side (upper side) of the second valve element 7, and the third valve chest 2f to communicate with each other. For example, the conduction hole 2k is inclined with respect to the vertical direction and is formed at a position, which deviates from the lateral stepped hole 10c and the lateral passage 2i in a forward and rearward direction, so as not to interfere with the lateral stepped hole 10c and the lateral passage 2i.

Furthermore, insertion holes 2m, which extend up to the upper end face of the longitudinal stepped hole 10f from the lower end face of the longitudinal stepped hole 10d in the vertical direction, are formed in the valve body 2 so that actuating rods 9 to be described below are inserted into the insertion holes 2m. For example, two insertion holes 2m (2ma, 2mb) are formed at positions, which are opposite to each other with respect to the center of the lower end face of the longitudinal stepped hole 10d or the upper end face of the longitudinal stepped hole 10f, so as not to interfere with (the small-diameter passage of) the lateral stepped hole 10c.

The first valve element 6 fitted to the first valve chest 2d includes a substantially columnar large-diameter sliding portion 6c, a substantially columnar small-diameter intermediate portion 6d, and a medium-diameter valve element portion 6e in this order from the upper side. The large-diameter sliding portion 6c slides on an inner wall surface of the first valve chest 2d (particularly, an inner peripheral portion of a recessed hollow formed on the lower surface of the attractor 16), and the medium-diameter valve element portion 6e is provided with a seal member 6f that approaches and is separated from the first valve seat 3. Further, a through hole 6a is formed in the first valve element 6 over the vertical direction.

A protruding portion 6g with which a valve element 15a mounted on a valve holder 15 to be described below comes into contact is formed in the vicinity of the center of the upper surface of the large-diameter sliding portion 6c. Furthermore, a piston ring 20 made of a synthetic resin such as Teflon (registered trademark) is mounted in an annular groove formed on the outer peripheral surface of the large-diameter sliding portion 6c, and the large-diameter sliding portion 6c is adapted to move in the longitudinal direction (vertical direction) while the outer peripheral surface of the large-diameter sliding portion 6c comes into slide contact with the inner wall surface of the first valve chest 2d. Moreover, a spring receiving seat face formed of a step is formed at an outer edge portion of the lower surface of the large-diameter sliding portion 6c, and a coil spring 22 is compressed between the spring receiving seat face and the lower end face of the longitudinal stepped hole 10d in order to bias the first valve element 6 to the upper side (in a direction in which the first valve port 3a is opened). Meanwhile, the large-diameter sliding portion 6c is provided with a communication passage 6b. The communication passage 6b is formed of a longitudinal stepped hole allowing a portion of the first valve chest 2d, which is closer to the first valve seat 3 than the first valve element 6, and a portion of the first valve chest 2*d* opposite thereto (the back side of the first valve element 6) to communicate with each other.

Meanwhile, an annular groove is formed on the lower end face of the medium-diameter valve element portion 6*e*; an annular seal member 6*f*, which is separated from and approaches the first valve seat 3 to open and close the first valve port 3*a* and is made of rubber, Teflon (registered trademark), or the like, is fitted to the annular groove; and a lower end portion (a portion forming a lower end of the through hole 6*a*) of the medium-diameter valve element portion 6*e* is caulked outward while an annular washer 6*h* is provided on the lower end portion of the medium-diameter valve element portion 6*e*. Accordingly, the seal member 6*f* is fixed to the annular groove of the medium-diameter valve element portion 6*e*.

The second valve element 7 fitted to the second valve chest 2*e* includes a substantially cylindrical large-diameter sliding portion 7*c*, a substantially columnar small-diameter intermediate portion 7*d*, and a medium-diameter valve element portion 7*e* in this order from the upper side. The large-diameter sliding portion 7*c* includes a bottom portion 7*g* and slides on the inner wall surface of the second valve chest 2*e* (particularly, a sliding surface 10*ec* formed of an inner peripheral portion of the longitudinal stepped hole 10*e*), and the medium-diameter valve element portion 7*e* is provided with a seal member 7*f* that approaches and is separated from the second valve seat 4.

A piston ring 23 made of a synthetic resin such as Teflon (registered trademark) is mounted in an annular groove formed on the outer peripheral surface of the large-diameter sliding portion 7*c*, and the large-diameter sliding portion 7*c* is adapted to move in the longitudinal direction (vertical direction) while the outer peripheral surface of the large-diameter sliding portion 7*c* comes into slide contact with the sliding surface 10*ec*. Further, a coil spring 12*a* is compressed between the bottom of a spring receiving hole 7*i*, which is formed of a cylindrical space of the large-diameter sliding portion 7*c*, (the upper surface of the bottom portion 7*g*) and the upper surface of a recessed spring receiving hole 11*aa*, which is formed on the lower surface of the lid member 11*a*, in order to bias the second valve element 7 to the lower side (in a direction in which the second valve port 4*a* is closed). Furthermore, a reduced diameter portion 7*k*, which is formed at an upper end portion of the large-diameter sliding portion 7*c*, functions as a stopper that defines an upper movement limit of the second valve element 7 by coming into contact with the bottom of the lid member 11*a* (the bottom positioned outside the spring receiving hole 11*aa*); and a plurality of releasing holes 7*m* are provided at the reduced diameter portion 7*k* in a circumferential direction in order to release the internal pressure of the spring receiving hole 7*i* to the outside of the spring receiving hole 7*i* (that is, the conduction hole 2*k*) when the reduced diameter portion 7*k* comes into contact with the bottom of the lid member 11*a*. Moreover, the bottom portion 7*g* of the large-diameter sliding portion 7*c* is provided with a communication passage 7*b*. The communication passage 7*b* is formed of a longitudinal hole allowing an outflow chamber 2*ea*, which is formed on the lower side (the side close to the second valve seat 4) of the second valve element 7, and the back pressure chamber 2*eb*, which is formed on the upper side (the side opposite to the second valve seat 4), to communicate with each other.

Meanwhile, a longitudinal recessed hole 7*a* is formed on the lower end face of the medium-diameter valve element portion 7*e*. Further, an annular groove is formed on the lower end face (a portion outside the recessed hole 7*a*) of the medium-diameter valve element portion 7*e*; an annular seal member 7*f*, which is separated from and approaches the second valve seat 4 to open and close the second valve port 4*a* and is made of rubber, Teflon (registered trademark), or the like, is fitted to the annular groove; and a lower end portion (a portion forming a lower end of the recessed hole 7*a*) of the medium-diameter valve element portion 7*e* is caulked outward while an annular washer 7*h* is provided on the lower end portion of the medium-diameter valve element portion 7*e*. Accordingly, the seal member 7*f* is fixed to the annular groove of the medium-diameter valve element portion 7*e*.

Furthermore, the third valve element 8 fitted to the third valve chest 2*f* includes a substantially cylindrical large-diameter sliding portion 8*c* that includes a ceiling portion 8*g* and slides on the inner wall surface of the third valve chest 2*f*, and a small-diameter valve element portion 8*e* that protrudes upward from a substantially central portion of the ceiling portion 8*g* of the large-diameter sliding portion 8*c* and is provided with a seal member 8*f* approaching and being separated from the third valve seat 5.

A coil spring 12*b* is compressed between the upper surface of a spring receiving hole 8*i*, which is formed of a cylindrical space of the large-diameter sliding portion 8*c*, (the lower surface of the ceiling portion 8*g*) and the upper surface of the lid member 11*b* in order to bias the third valve element 8 to the upper side (in a direction in which the third valve port 5*a* is closed). Furthermore, the ceiling portion 8*g* of the large-diameter sliding portion 8*c* is provided with a communication passage 8*b* that is formed of a longitudinal hole allowing the upper side (the side close to the third valve seat 5) and the lower side (the side opposite to the third valve seat 5) of the third valve element 8 to communicate with each other.

Meanwhile, a recessed groove, which has a circular shape in plan view, is formed on the upper end face of the small-diameter valve element portion 8*e*; a disc-like seal member 8*f*, which is separated from and approaches the third valve seat 5 to open and close the third valve port 5*a* and is made of rubber, Teflon (registered trademark), or the like, is fitted to the recessed groove; and an outer peripheral portion of the recessed groove is caulked inward. Accordingly, the seal member 8*f* is fixed to the recessed groove of the medium-diameter valve element portion 8*e*.

Actuating rods 9, which are made of, for example, metal, as an actuating member are interposed between the above-mentioned first and third valve elements 6 and 8 in order to move the third valve element 8 in a direction, in which the third valve element 8 is separated from the third valve seat, (when the first valve element 6 is moved down toward the first valve seat 3) according to the upward/downward movement of the first valve element 6 that is caused by the actuation of the electromagnetic actuator 30.

The actuating rods 9 (9*a*, 9*b*) are slidably inserted into insertion holes 2*m* (2*ma*, 2*mb*), which are formed in the valve body 2 so as to extend in the vertical direction, in the vertical direction, respectively; and are adapted so that upper ends thereof come into contact with the lower end face of (the medium-diameter valve element portion 6*e* of) the first valve element 6 and lower ends thereof come into contact with the upper end face of (the ceiling portion 8*g* of the large-diameter sliding portion 8*c* of) the third valve element 8. However, the actuating rods 9 (9*a*, 9*b*) are disposed so that the upper ends of the actuating rods 9 (9*a*, 9*b*) are spaced apart from the lower end face of the first valve element 6 when the electromagnetic actuator 30 is not actuated (when current is not applied to an electromagnetic coil 14*a*) (see FIG. 1).

The electromagnetic actuator 30 is provided above the valve body 2 so as to cover the longitudinal stepped hole 10d, and is fastened and fixed to the valve body 2 by fastening screws 26.

The electromagnetic actuator 30 mainly includes an attractor 16 that is threadedly engaged with the upper end opening of the longitudinal stepped hole 10d so as to close the upper end opening of the longitudinal stepped hole 10d, a pipe 21 that is formed of a cylindrical member including a ceiling portion and fixed to an upper end portion of the attractor 16 so as to cover the upper end portion of the attractor 16, a plunger 13 that is formed of a cylindrical member including a bottom portion and disposed in the pipe 21 so as to be movable up and down, a valve holder 15 that is mounted integrally on the plunger 13 and is provided with a valve element 15a at a lower end thereof, a coil spring 19 that biases the plunger 13 to the upper side, a bobbin 27 that is inserted around and fixed to the pipe 21, an electromagnetic coil assembly 14 that is formed of an electromagnetic coil 14a for conduction and excitation disposed outside the bobbin 27, and a case 28 that is disposed so as to cover the outside of the bobbin 27 and the electromagnetic coil assembly 14.

A lower end of the pipe 21 is inserted around the outer periphery of the upper end portion of the attractor 16, and is fixed to the upper end portion of the attractor 16 by soldering, welding, or the like.

An insertion hole 16a, which extends in the longitudinal direction, is formed in the attractor 16 so that the valve holder 15 is inserted into the insertion hole 16a. Further, a through hole 13a, which has substantially the same diameter as the upper end portion of the valve holder 15, is formed substantially at the center of the bottom portion of the plunger 13 so that the upper end portion of the valve holder 15 is held by the through hole 13a. While the upper end portion of the valve holder 15 is fitted to the through hole 13a of the bottom portion of the plunger 13, the valve holder 15 is inserted into the insertion hole 16a of the attractor 16 and the valve element 15a provided at the lower end portion of the valve holder 15 is disposed in the first valve chest 2d. Furthermore, the lower surface of the plunger 13 has a shape complementary to the upper surface of the attractor 16 (the surface of the attractor 16 facing the lower surface of the plunger 13), and the coil spring 19 is compressed between the lower surface of the plunger 13 and a spring receiving seat face 16b that is formed of an annular step formed on an inner peripheral portion of the insertion hole 16a of the attractor 16. When the plunger 13 is moved in the vertical direction due to the application of current to the electromagnetic coil 14a, the valve element 15a disposed in the first valve chest 2d approaches or is separated from the upper end portion (the protruding portion 6g) of the first valve element 6, which is slidably disposed in the first valve chest 2d, to move the first valve element 6 up or down.

Meanwhile, the valve holder 15 is provided with a longitudinal hole 15b that extends up to the valve element 15a from the upper end portion of the valve holder 15 in the longitudinal direction and a lateral hole 15c that crosses the longitudinal hole 15b so as to communicate with the first valve chest 2d.

Next, the operation of the three-way solenoid valve 1 having the above-mentioned structure will be described.

When current is not applied to the electromagnetic coil 14a of the electromagnetic coil assembly 14, as illustrated in FIG. 1, the plunger 13 is biased upward by the biasing force of the coil spring 19, the first valve element 6 is biased upward by the biasing force of the coil spring 22, and the first valve element 6 is separated from the first valve seat 3 so that the first valve port 3a is opened. Further, the second valve element 7 is biased downward by the biasing force of the coil spring 12a and the second valve element 7 is seated on the second valve seat 4, so that the second valve port 4a is closed. Furthermore, since the actuating rods 9 (9a, 9b), which come into contact with (the ceiling portion 8g of the large-diameter sliding portion 8c of) the third valve element 8, and the first valve element 6 are disposed so as to be spaced apart from each other, the third valve element 8 is biased upward by the biasing force of the coil spring 12b and the third valve element 8 is seated on the third valve seat 5. Accordingly, the third valve port 5a is closed.

When fluid is made to flow from the inlet 2a in this state, the flow rate of fluid flowing into the front side (the first valve seat 3) of the first valve element 6 through the through hole 6a becomes higher than the flow rate of fluid flowing into the back side (the side opposite to the first valve seat 3) of the first valve element 6 through the communication passage 6b formed in the large-diameter sliding portion 6c of the first valve element 6. Accordingly, a force in a direction in which the valve is opened is applied to the first valve element 6 in addition to a pressing force that is applied by the coil spring 22.

Therefore, the fluid (refrigerant) flowing in from the inlet 2a is made to flow to the first outlet 2b through the first valve chest 2d and the longitudinal passage 2g.

When current is applied to the electromagnetic coil 14a of the electromagnetic coil assembly 14 in a state in which the fluid is made to flow from the inlet 2a, the plunger 13 is attracted to the attractor 16 and is moved down against the biasing force of the coil spring 19 as illustrated in FIG. 2. Accordingly, the valve holder 15, which is mounted integrally on the plunger 13, is also moved down. When the valve holder 15 is moved down, the valve element 15a provided at the lower end portion of the valve holder 15 is pressed against the upper end portion (the protruding portion 6g) of the first valve element 6. Accordingly, the flow of fluid at the through hole 6a is blocked and a pressure difference between the front and the rear sides of the first valve element 6 is balanced. As a result, the first valve element 6 is pushed down against the biasing force of the coil spring 22 by the pressing force of the valve element 15a. As described above, the valve holder 15 and the valve element 15a function as a pilot valve element of the first valve element 6. That is, the first valve element 6, the valve holder 15, and the valve element 15a form a pilot valve.

When the first valve element 6 is pushed down, the lower end portion of the first valve element 6 come into contact with the upper end portions of the actuating rods 9 (9a, 9b) before the first valve element 6 is seated on the first valve seat 3. After the first valve element 6 comes into contact with the actuating rods 9, the valve element 6 is further pushed down while pushing down the third valve element 8 against the biasing force of the coil spring 12b through the actuating rods 9. When the first valve element 6 is further pushed down, the first valve element 6 is seated on the first valve seat 3 so that the first valve port 3a is closed, and the third valve element 8 is separated from the third valve seat 5 so that the third valve port 5a is opened. When the third valve element 8 is pushed down and the third valve port 5a is opened, differential pressure between the back pressure chamber 2eb of the second valve chest 2e, which communicates with the third valve chest 2f through the conduction hole 2k, and the outflow chamber 2ea, which is closer to the second valve seat 4 than the second valve element 7, is changed (the pressure of the back pressure chamber 2eb becomes lower than the pressure of the outflow chamber 2ea), the second valve element 7 is moved up against the biasing force of the coil spring 12a, and the second valve element 7 is separated from the second valve seat 4. Accordingly, the second valve port 4a is opened. In this way, the third valve element 8 functions as a pilot valve element of the second valve element 7. That is, the second valve element 7 and the third valve element form a pilot valve.

Accordingly, fluid (refrigerant) flowing in from the inlet 2a is made to flow to the second outlet 2c through the first valve chest 2d, the lateral passage 2i, the outflow chamber 2ea of the second valve chest 2e, and the longitudinal passage 2h.

Meanwhile, when the application of current to the electromagnetic coil 14a of the electromagnetic coil assembly 14 is stopped, the plunger 13 is biased upward by the biasing force of the coil spring 19, the first valve element 6 is biased upward by the biasing force of the coil spring 22, and the first valve element 6 is separated from the first valve seat 3. Accordingly, the first valve port 3a is opened. Therefore, the third valve element 8, which has been pushed down through the actuating rods 9, is biased upward by the biasing force of the coil spring 12b and the third valve element 8 is seated on the third valve seat 5, so that the third valve port 5a is closed. When the first valve port 3a is opened and the third valve port 5a is closed, differential pressure between the back pressure chamber 2eb of the second valve chest 2e, which communicates with the third valve chest 2f through the conduction hole 2k, and the outflow chamber 2ea, which is closer to the second valve seat 4 than the second valve element 7, is changed, the second valve element 7 is moved down by the biasing force of the coil spring 12a, and the second valve element 7 is seated on the second valve seat 4, so that the second valve port 4a is closed.

In the three-way solenoid valve 1 having this structure, the valve body 2 includes the conduction hole 2k that communicates with the back pressure chamber 2eb formed on the side of the second valve element 7 opposite to the second valve seat 4, the third valve seat 5 that is positioned between the conduction hole 2k and the second outlet 2c, the third valve element 8 that is movably disposed so as to approach and be separated from the third valve seat 5, the coil spring 12b as a biasing member that biases the third valve element 8 toward the third valve seat 5, and the actuating rods 9 as the actuating member that are interposed between the first valve element 6 and the third valve element 8 in order to actuate the third valve element 8 in a direction in which the third valve element 8 is separated from the third valve seat 5. Accordingly, it is possible to ensure the diameter of the second valve port 4a that is formed at the second valve seat 4 while reducing the diameter of the third valve port 5a that is formed at the third valve seat 5. For this reason, it is possible to reliably switch a flow passage while ensuring a flow rate even under a large-differential pressure environment without increasing the size of the electromagnetic coil 14a and the like.

Further, the structures disposed in the valve body 2, such as the first valve chest 2d in which the first valve element 6 is disposed, the second valve chest 2e in which the second valve element 7 is disposed, and the third valve chest 2f in which the third valve element 8 is disposed, may be appropriately changed. However, as described above, the first valve chest 2d and the second valve chest 2e are disposed side by side in the lateral direction (a direction orthogonal to the moving directions of the first valve element 6, the second valve element 7, and the third valve element 8), the first valve chest 2d and the third valve chest 2f are disposed side by side in the longitudinal direction (the moving directions of the first valve element 6, the second valve element 7, and the third valve element 8), and the conduction hole 2k, which allows the third valve chest 2f and the back pressure chamber 2eb of the second valve chest 2e to communicate with each other, is disposed so as to be inclined. Accordingly, it is possible to simplify a process for manufacturing the three-way solenoid valve 1 while reducing the physical size of the three-way solenoid valve 1.

Further, when the electromagnetic actuator 30 is not actuated, the actuating rod 9 and the first valve element 6 are disposed so as to be spaced apart from each other. When the electromagnetic actuator 30 is actuated and current is applied to the electromagnetic coil 14a of the electromagnetic coil assembly 14, the plunger 13 approaches the attractor 16 and the lower end portion of the first valve element 6 comes into contact with the upper end portions of the actuating rods 9 before the first valve element 6 is seated on the first valve seat 3. Then, the first valve element 6 pushes down the third valve element 8 through the actuating rods 9. Accordingly, since it is possible to increase a push-down force that is transmitted to the third valve element 8 through the actuating rods 9, it is possible to switch a flow passage by reliably and quickly push down the third valve element 8.

Meanwhile, according to the above-mentioned embodiment, when the electromagnetic actuator 30 is not actuated (when current is not applied to the electromagnetic coil 14a), the first valve element 6 is separated from the first valve seat 3 so that the first valve port 3a is opened and the second valve element 7 is seated on the second valve seat 4 so that the second valve port 4a is closed. Further, when the electromagnetic actuator 30 is actuated (when current is applied to the electromagnetic coil 14a), the first valve element 6 is seated on the first valve seat 3 so that the first valve port 3a is closed and the second valve element 7 is separated from the second valve seat 4 so that the second valve port 4a is opened. However, for example, when the electromagnetic actuator 30 is not actuated (when current is not applied to the electromagnetic coil 14a), the first valve element 6 may be seated on the first valve seat 3 so that the first valve port 3a is closed and the second valve element 7 may be separated from the second valve seat 4 so that the second valve port 4a is opened. Further, when the electromagnetic actuator 30 is actuated (when current is applied to the electromagnetic coil 14a), the first valve element 6 may be separated from the first valve seat 3 so that the first valve port 3a is opened and the second valve element 7 may be seated on the second valve seat 4 so that the second valve port 4a is closed.

Furthermore, two actuating rods as the actuating member have been used in the above-mentioned embodiment. However, the number of the actuating rods is not particularly limited, and actuating members other than rod-like members may be used to move the third valve element in a direction in which the third valve element is separated from the third valve seat.

In addition, the lid members 11a and 11b and the attractor 16 have been mounted on the valve body 2 by threaded engagement in the above-mentioned embodiment. However, needless to say, the lid members 11a and 11b and the attractor 16 may be fixed to the valve body by, for example, caulking or the like.

What is claimed is:
1. A three-way solenoid valve comprising:
   a valve body that is provided with an inlet, first and second outlets, a first valve seat positioned between the inlet and the first outlet, and a second valve seat positioned between the inlet and the second outlet;
   a first valve element that is movably disposed in the valve body so as to approach and be separated from the first valve seat;
   an electromagnetic actuator that drives the first valve element; and a second valve element that is movably disposed in the valve body so as to approach and be separated from the second valve seat, wherein the valve body includes a conduction hole that communicates with a back pressure chamber formed on a side of the second valve element opposite to the second valve seat, a third valve seat that is positioned between the conduction hole and the second outlet, a third valve element that is movably disposed so as to approach and be separated from the third valve seat, a biasing member that biases the third valve element toward the third valve seat, and an actuating member that is interposed between the first valve element and the third valve element, and when the first valve element is moved in the valve body by the electromagnetic actuator and approaches or is separated from the first valve seat, the third valve element is separated from or approaches, respectively, the third valve seat by the actuating member or the biasing member and differential pressure between the front and the rear sides of the second valve element is changed through the conduction hole, so that the second valve element is separated from or approaches, respectively, the second valve seat.

2. The three-way solenoid valve according to claim 1, wherein a first valve chest in which the first valve element is disposed and a second valve chest in which the second valve element is disposed are disposed side by side in a lateral direction.

3. The three-way solenoid valve according to claim 1, wherein a first valve chest in which the first valve element is disposed and a third valve chest in which the third valve element is disposed are disposed side by side in a longitudinal direction.

4. The three-way solenoid valve according to claim 1, wherein a first valve chest in which the first valve element is disposed and a second valve chest in which the second valve element is disposed are disposed side by side in a lateral direction, the first valve chest and a third valve chest in which the third valve element is disposed are disposed side by side in a longitudinal direction, and the conduction hole, which allows the third valve chest and the back pressure chamber of the second valve chest to communicate with each other, is disposed so as to be inclined.

5. The three-way solenoid valve according to claim 1, wherein the diameter of a valve port formed at the second valve seat is larger than the diameter of a valve port formed at the third valve seat.

6. The three-way solenoid valve according to claim 1, wherein when the electromagnetic actuator is not actuated, the actuating member and the first valve element are disposed so as to be spaced apart from each other.

7. The three-way solenoid valve according to claim 1, wherein back pressure on a side opposite to the first valve seat is controlled by a pilot valve element driven by the electromagnetic actuator, so that the first valve element is operated.

* * * * *